United States Patent
Kim et al.

(10) Patent No.: US 7,365,507 B2
(45) Date of Patent: Apr. 29, 2008

(54) POWER CONTROL APPARATUS FOR MOTOR

(75) Inventors: Sang-young Kim, Gwangmyeong-si (KR); Yo-han Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/295,507

(22) Filed: Dec. 7, 2005

(65) Prior Publication Data
US 2006/0145645 A1    Jul. 6, 2006

(30) Foreign Application Priority Data
Jan. 6, 2005    (KR) .................. 10-2005-0001334

(51) Int. Cl.
*H02H 7/08*    (2006.01)
*G01N 27/12*    (2006.01)
(52) U.S. Cl. ...................... 318/483; 324/557
(58) Field of Classification Search ........ 318/481–483, 318/490; 324/557–559; 361/23–34, 42–50; 388/903
See application file for complete search history.

(56) References Cited

U.S. PATENT DOCUMENTS

| | | | |
|---|---|---|---|
| 3,582,712 A * | 6/1971 | Blair | 361/25 |
| 3,757,721 A * | 9/1973 | Ohishi | 114/315 |
| 3,800,205 A * | 3/1974 | Zalar | 318/482 |
| 3,801,889 A * | 4/1974 | Quinn | 318/481 |
| 4,540,922 A * | 9/1985 | Horvath et al. | 318/490 |
| 4,716,487 A * | 12/1987 | Horvath et al. | 361/42 |
| 4,953,784 A * | 9/1990 | Yasufuku et al. | 236/44 A |
| 5,232,152 A * | 8/1993 | Tsang | 236/44 A |
| 5,751,132 A * | 5/1998 | Horvath et al. | 318/798 |
| 6,320,731 B1* | 11/2001 | Eaves et al. | 361/42 |
| 6,926,602 B1* | 8/2005 | Reese | 454/239 |

* cited by examiner

*Primary Examiner*—Bentsu Ro
(74) *Attorney, Agent, or Firm*—Birch, Stewart, Kolasch & Birch, LLP

(57) ABSTRACT

A power control apparatus for a motor is disclosed. The power control apparatus includes: a moisture sensor for detecting moisture soaking into a housing including the motor; and a switching unit which is switched by an output signal of the moisture sensor, and switches on or off an AC power-supply signal applied to a driver circuit for providing the motor with a drive power-supply signal. Therefore, if moisture soaks into the suction apparatus including the motor, the AC power-supply signal applied to the driver circuit is blocked due to the moisture, such that a user can be protected from electric shock.

14 Claims, 3 Drawing Sheets

POWER CONTROL APPARATUS FOR MOTOR

BACKGROUND OF THE INVENTION

1. Field of the Invention

The present invention relates to a wet/dry suction apparatus, and more particularly to an apparatus for blocking a power-supply signal from being applied to a wet/dry motor when receiving moisture.

2. Description of the Related Art

When a variety of structures are manufactured in an industrial field or other tasks are carried out in the industrial field, a large amount of dust and waste is generated. In order to guarantee security of the tasks and rapidly prosecute a necessary process, the dust or the wastes must be removed at all times. The wastes are classified into dry wastes and wet wastes according to the presence or absence of moisture in the wastes. The above-mentioned wastes are collected in different suction devices (e.g., cleaners) according to categories of the wastes, and are then discarded.

However, if a variety of wastes generated according to task methods and task processes are removed by additional suction devices classified according to categories of the wastes, this is considered to be ineffective in terms of cost and time. In order to solve the above-mentioned cost-ineffective and time-ineffective problems, there have been developed wet/dry suction devices capable of removing both wet wastes and dry wastes.

A representative example of the above-mentioned wet/dry suction devices is a wet/dry cleaner. The wet/dry cleaners have been widely used in the United States and Europe in which most people use carpet in their rooms. Differently from a general cleaner, the wet/dry cleaner can absorb water, so that it can perform a variety of cleaning services such as a window cleaning.

However, compared with the general cleaner, the wet/dry cleaner is very noisy, and has a high possibility of incurring electric shock of a user due to moisture covering the wet/dry cleaner. Although manufactured products have been generally designed to satisfy requirements of a safety structure, moisture may be unexpectedly applied to the inside of the manufactured products. In conclusion, there must be developed a safety device capable of protecting the user from electric shock caused by the moisture inflow or another electric shock caused by a dielectric breakdown of a motor case.

SUMMARY OF THE INVENTION

Therefore, the present invention has been made in view of the above problems, and it is an object of the invention to provide an apparatus for blocking a power-supply signal from being applied to a wet/dry motor when moisture is received in a housing, such that a user can be protected from electric shock.

It is another object of the present invention to provide an apparatus for blocking a power-supply signal from being applied to a wet/dry motor when a dielectric breakdown of a motor case occurs, such that a user can be protected from electric shock.

In accordance with one aspect of the present invention, these objects are accomplished by providing a power control apparatus for use in a wet/dry motor comprising: a moisture sensor for detecting moisture soaking into a housing including the wet/dry motor; and a switching unit which is switched by an output signal of the moisture sensor, and switches on or off an AC power-supply signal applied to a driver circuit capable of providing the wet/dry motor with a drive power-supply signal.

In the above preferred embodiment of the present invention, the power control apparatus blocks an AC power-supply signal from flowing in a driver circuit due to moisture soaking into a suction apparatus including the wet/dry motor, so that it can protect a user from electric shock.

In accordance with another aspect of the present invention, there is provided a power control apparatus for use in a wet/dry motor comprising: a moisture sensor for detecting moisture soaking into a housing including the wet/dry motor; an insulation resistance detector (IRD) for detecting the presence or absence of a dielectric breakdown occurs in a case of the wet/dry motor; and a switching unit which is switched by an output signal of the moisture sensor or an output signal of the IRD, and switches on or off an AC power-supply signal applied to a driver circuit for providing the wet/dry motor with a drive power-supply signal.

In the above preferred embodiment of the present invention, the power control apparatus blocks the AC power-supply signal from flowing in the driver circuit due to moisture soaking into a suction apparatus including the wet/dry motor, so that it can protect a user from electric shock.

Also, the power control apparatus blocks the AC power-supply signal from flowing in the driver circuit although a dielectric breakdown between the case of a motor and a power-supply reception terminal of the motor occurs, so that it can protect the user from electric shock caused by the dielectric breakdown of the case of the wet/dry motor.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
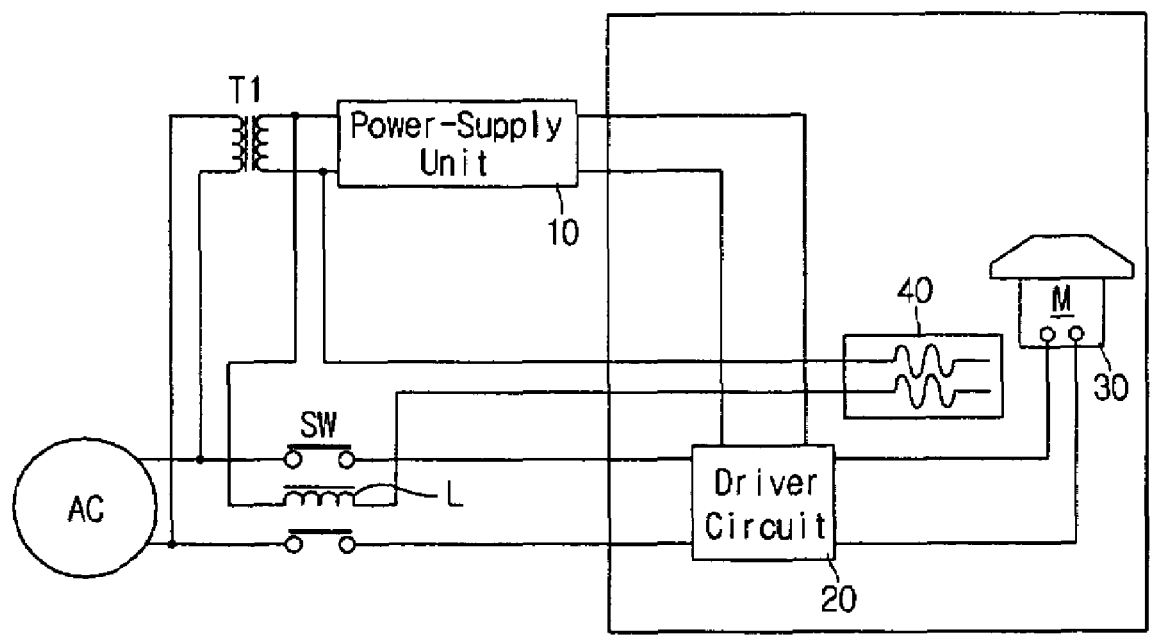
FIG. 1 is a circuit diagram illustrating an apparatus for blocking a power-supply signal from being applied to a wet/dry motor in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a circuit diagram illustrating an apparatus for blocking a power-supply signal from being applied to a wet/dry motor in accordance with a preferred embodiment of the present invention. The apparatus is also called a power control apparatus for use in the wet/dry motor. As shown in FIG. 1., the power control apparatus for use in the wet/dry motor includes a step-down transformer T1, a relay coil L, a moisture sensor 40, and a relay switch SW.

In FIG. 1, the transformer T1 decreases an AC power-supply signal according to a predetermined turn ratio. The decreased AC power-supply signal is applied to a power-supply unit 10 for generating a plurality of DV power-supply voltages (e.g., 5V, 12V, . . . ) necessary for operations of the wet/dry suction apparatus.

In the meantime, the relay coil L and the moisture sensor 40 are connected in parallel to a power-supply output terminal of the transformer T1.

If moisture induced in a housing including the wet/dry motor soaks into the moisture sensor 40, insulation resistance of the moisture sensor is reduced, so that a current signal generated from the transformer T1 flows in the relay coil L and the moisture sensor 40. Generally, moisture moves to the lowest position of the housing including the wet/dry motor, such that it is preferable that the moisture sensor 40 is mounted to the bottom of the housing.

In the meantime, the relay switch SW coupled with the relay coil L switches on or off the AC power-supply signal applied to a driver circuit 20 capable of providing the wet/dry motor 30 with a drive power-supply signal by determining whether the relay coil L receives electricity. The relay coil L and the relay switch SW can be implemented with a specific relay called a one-form relay.

Operations of the above-mentioned power control apparatus will hereinafter be described.

Insulation resistance of the moisture sensor 40 is very high in a normal state during which moisture does not soak into the moisture sensor 40, such that a current signal does not flow in the relay coil L. Therefore, the AC power-supply signal is normally applied to the driver circuit 20 via the relay switch SW. The driver circuit 20 generates a drive voltage according to a predetermined motor control sequence, and transmits the drive voltage to the wet/dry motor 30. Therefore, the motor 30 is driven so that the wet/dry suction apparatus sucks wastes.

However, if the moisture soaks into the moisture sensor 40, the insulation resistance of the moisture sensor 40 is reduced, and a current signal flows in the relay coil L. Therefore, due to the conduction of the relay coil L, the switch SW is turned off, and the AC power-supply signal applied to the driver circuit 20 is blocked. If the insulation resistance of the moisture sensor 40 is increased, the AC power-supply signal may be supplied to the driver circuit 20.

As described above, although the moisture soaks into the housing, the AC power-supply signal applied to the apparatus is automatically blocked, resulting in the prevention of electric shock caused by the moisture.

The above-mentioned preferred embodiment has disclosed that the relay coil L and the moisture sensor 40 connected in series are connected in parallel to the power-supply output terminal of the transformer T1. But, provided that the relay coil L and the moisture sensor 40 connected in series are connected in parallel to the output terminal of the power-supply unit 10, the same effect as in the above-mentioned preferred embodiment can be obtained.

Figure 2:
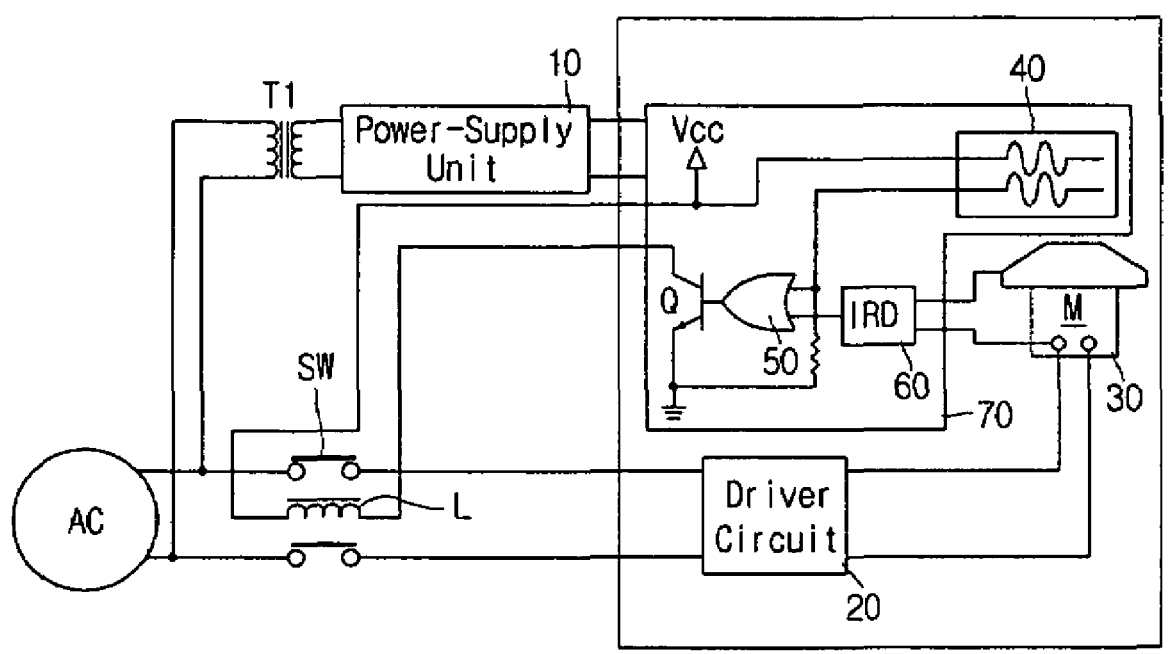
FIG. 2 is a circuit diagram illustrating an apparatus for blocking a power-supply signal from being applied to a wet/dry motor in accordance with another preferred embodiment of the present invention.
Figure 3:
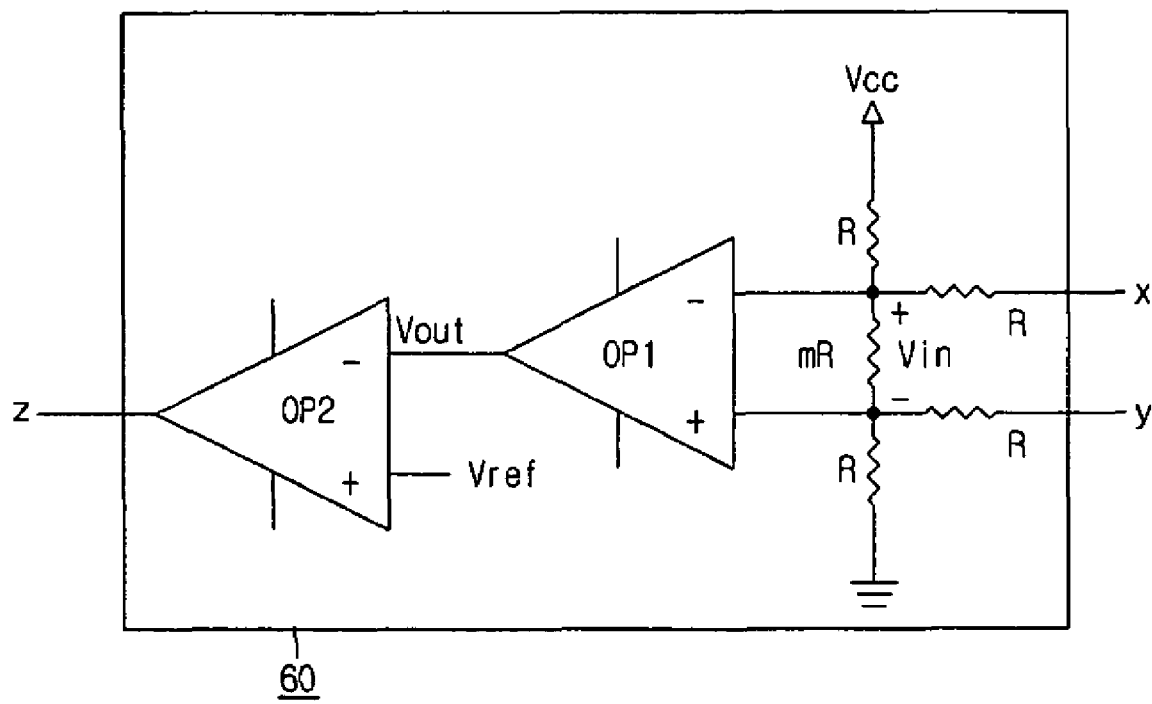
FIG. 3 is a circuit diagram illustrating an insulation resistance detector (IRD) shown in FIG. 2 in accordance with the present invention.

FIG. 2 is a circuit diagram illustrating an apparatus for blocking a power-supply signal from being applied to a wet/dry motor in accordance with another preferred embodiment of the present invention. FIG. 3 is a circuit diagram illustrating the IRD shown in FIG. 2 in accordance with the present invention.

Referring to FIG. 2, the transformer T1 decreases the AC power-supply signal generated from the AC power source (AC), and generates the decreased AC power-supply signal. The power-supply unit 10 generates a DC power-supply voltage (Vcc) necessary for operations of the wet/dry suction apparatus upon receipt of the decreased AC power-supply signal, and generates the DC power-supply voltage Vcc.

One end of the relay coil L is connected to the output terminal of the Vcc output terminal of the power-supply unit 10. The relay switch SW for switching on or off the AC power-supply signal applied to the driver circuit 20, capable of providing the wet/dry motor 30 with a drive power-supply signal according to a conductive or nonconductive state of the relay coil L, is connected to a power-supply path of the AC power source (AC).

A power control apparatus for use in a wet/dry motor in accordance with another preferred embodiment of the present invention further includes a detection unit 70. The detection unit 70 detects moisture soaking into the housing, detects a dielectric breakdown of the motor case, and grounds one end of the relay coil L to allow a current signal to flow in the relay coil L according to the detected state.

The detection unit 70 includes: a moisture sensor 40 for reducing an insulation resistance by determining whether moisture soaks into the housing, and decreases the DC power-supply signal (Vcc); an IRD (Insulation Resistance Detector) 60 for detecting an insulation resistance between the case of the motor 30 and a power-supply reception terminal of the motor 30; a gate element 50 for performing a logic OR operation between an output signal of the moisture sensor 40 and an output signal of the IRD 60; and an active switch Q for grounding one end of the relay coil L according to an output signal level of the gate element 50.

The IRD 60 contained in the detection unit 70 can be implemented with a differential amplifier OP1 and a comparator OP2 having a predetermined I/O (Input/Output) ratio of 1 therebetween, as shown in FIG. 3. Referring to FIG. 3, a first input terminal X is connected to the case of the motor M, and a second input terminal Y is connected to a power-supply reception terminal of the motor M. An output terminal Z of the IRD 60 is connected to an input terminal of the gate element 50. Characteristics of the IRD 60 will hereinafter be described in detail for convenience of description and better understanding of the present invention.

Provided that an insulation state between the motor case and the power-supply reception terminal of the motor is completely maintained, insulation resistance between the input terminals X and Y of the IRD 60 is nearly infinite, the input voltage (Vin) is denoted by $Vcc \times m/(2+m)$. If the insulation state between the input terminals X and Y of the IRD 60 is broken (i.e., a dielectric breakdown between the X and Y terminals occurs) the input voltage (Vin) is denoted by $Vcc \times 0.5$. In other words, it can be recognized that the output signal (Vout) of the differential amplifier OP1 is gradually decreased from a predetermined level denoted by $Vcc \times m/(2+m)$ according to the insulation resistance between the input terminals X and Y.

For example, provided that the voltage of Vcc is 5V and the value of m (where, m>2) is 8, the input voltage (Vin) is decreased from 4V to 2.5V according to reduction of the insulation resistance. Therefore, if a reference voltage (Vref) of the comparator OP2 is set to a specific value between 4V and 2.5V, the comparator OP2 generates a logic high signal when the insulation resistance is reduced below a predetermined level.

Operations of the above-mentioned power control apparatus for use in the wet/dry motor in accordance with another preferred embodiment of the present invention will hereinafter be described in detail.

If moisture does not soak into the moisture sensor 40 due to the absence of moisture soaking into the housing, the insulation resistance of the moisture sensor 40 is very high, such that a logic low signal is applied to an input terminal of the gate element 50.

In the meantime, provided that an insulation state between the motor case and the power-supply reception terminal of the motor is completely maintained, the comparator OP2 maintains the logic low signal. Therefore, since the logic low signal is applied to the other input terminal of the gate element 50, the active switch Q maintains an OFF state, so that a current signal does not flow in the relay coil L.

Therefore, the AC power-supply signal is normally applied to the driver circuit 20. The driver circuit 20 generates a drive voltage according to a predetermined motor control sequence, and transmits the drive voltage to the wet/dry motor M, such that the wet/dry suction apparatus sucks wastes.

However, if moisture enters the housing and soaks into the moisture sensor 40, insulation resistance of the moisture sensor 40 is reduced. Therefore, a DC voltage of 5V is applied to the gate element 50, and the active switch Q is turned on, so that a current signal flows in the relay coil L. Since the relay coil L receives the current signal, the relay switch SW is turned off, so that the AC power-supply signal applied to the driver circuit 20 is blocked.

In this way, although moisture unexpectedly soaks into the housing, the AC power-supply signal applied to the apparatus is automatically blocked, resulting in the prevention of electric shock caused by the moisture.

In the meantime, if the insulation resistance is reduced due to a dielectric breakdown between the case of the motor and the power-supply reception terminal of the motor, the output terminal of the comparator OP2 is switched to a logic high signal. In this way, the logic high signal is applied to the gate element 50, the active switch element Q is turned on, such that a current signal flows in the relay coil L. If the current signal flows in the relay coil L, the switch SW is switched off, so that the AC power-supply signal applied to the driver circuit 20 is blocked.

Therefore, although a dielectric breakdown between the case of the motor and the power-supply reception terminal of the motor occurs, the power control apparatus according to the present invention blocks the AC power-supply signal from flowing in the driver circuit 20, so that it can protect a user from electric shock.

As apparent from the above description, the above-mentioned power control apparatus for use in the wet/dry motor blocks an AC power-supply signal from flowing in a driver circuit due to moisture soaking into a suction apparatus including the wet/dry motor, so that it can protect a user from electric shock.

Also, the above-mentioned power control apparatus blocks an AC power-supply signal from flowing in a driver circuit although a dielectric breakdown between the case of a motor and a power-supply reception terminal of the motor occurs, so that it can protect a user from electric shock caused by a dielectric breakdown of the case of the wet/dry motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power control apparatus for a motor comprising:
    a moisture sensor for detecting moisture soaked into a housing inside of which the motor is located, the moisture sensor being located outside of a case of the motor;
    an insulation resistance detector (IRD) for detecting the presence or absence of a dielectric breakdown occurs in the case of the motor; and
    a switching unit which is switched by an output signal of the moisture sensor or an output signal of the IRD, and switches on or off an AC power-supply signal applied to a driver circuit for providing the motor with a drive power-supply signal.

2. The apparatus according to claim 1, wherein the moisture sensor is a sensor for decreasing insulation resistance due to the moisture soaking into the housing.

3. The apparatus according to claim 1, wherein the moisture sensor is mounted to the bottom of the housing and outside of the case of the motor.

4. The apparatus according to claim 1, wherein the switching unit is a relay.

5. The apparatus according to claim 4, wherein the switching unit includes:
    a relay coil for entering a conductive or nonconductive state according to the output signal of the moisture sensor or the output signal of the IRD; and
    a relay switch for switching on or off the AC power-supply signal applied to the driver circuit according to the conductive or nonconductive state of the relay coil.

6. The apparatus according to claim 1, wherein the motor is a wet/dry motor.

7. A power control apparatus for a motor comprising:
    a moisture sensor for detecting moisture soaked into a housing including the motor;
    an insulation resistance detector (IRD) for detecting the presence or absence of a dielectric breakdown occurs in a case of the motor; and
    a switching unit which is switched by an output signal of the moisture sensor or an output signal of the IRD, and switches on or off an AC power-supply signal applied to a driver circuit for providing the motor with a drive power-supply signal,
    wherein the IRD includes:
    a differential amplifier for differentially amplifying a voltage generated by the insulation resistance between the case of the motor and a power-supply reception terminal of the motor; and
    a comparator for comparing an output voltage of the differential amplifier with a reference voltage, and generating a signal indicative of the compared result.

8. A power control apparatus for a motor comprising:
    a moisture sensor for detecting moisture soaked into a housing including the motor;
    an insulation resistance detector (IRD) for detecting the presence or absence of a dielectric breakdown occurs in a case of the motor; and
    a switching unit which is switched by an output signal of the moisture sensor or an output signal of the IRD, and switches on or off an AC power-supply signal applied to a driver circuit for providing the motor with a drive power-supply signal,
    wherein the switching unit is a relay,
    wherein the switching unit includes:

a relay coil for entering a conductive or nonconductive state according to the output signal of the moisture sensor or the output signal of the IRD; and a relay switch for switching on or off the AC power-supply signal applied to the driver circuit according to the conductive or nonconductive state of the relay coil, wherein:

the relay switch is positioned between an AC power source generating the AC power-supply signal and the driver circuit, and the relay coil is connected between an output terminal of a power-supply unit for generating a DC power-supply signal upon receiving the AC power-supply signal decreased by a transformer and an active switch, which is switched by the output signal of the moisture sensor or the output signal of the IRD and transmits a current signal to the relay coil.

9. The apparatus according to claim 8, wherein the active switch is switched by an output signal of a gate element for performing a logic OR operation between the output signal of the moisture sensor and the output signal of the IRD.

10. A power control apparatus for a motor comprising:
a moisture sensor for detecting moisture soaked into a housing inside of which the motor is located, the moisture sensor being located outside of a case of the motor; and a switching unit which is switched by an output signal of the moisture sensor, and switches on or off an AC power-supply signal applied to a driver circuit capable of providing the motor with a drive power-supply signal,
wherein the switching unit is a relay,
wherein the switching unit includes:
a relay coil for entering a conductive or nonconductive state according to the output signal of the moisture sensor; and
a relay switch for switching on or off the AC power-supply signal applied to the driver circuit according to the conductive or nonconductive state of the relay coil, wherein:
the relay switch is positioned between an AC power source generating the AC power-supply signal and the driver circuit,
the relay coil is connected in series to the moisture sensor, and
the relay coil and the moisture sensor connected in series are connected in parallel to an output terminal of a transformer capable of decreasing the AC power-supply signal.

11. The apparatus according to claim 10, wherein the moisture sensor is a sensor for decreasing insulation resistance due to the moisture soaking into the housing.

12. The apparatus according to claim 10, wherein the moisture sensor is mounted to the bottom of the housing and outside of the case of the motor.

13. The apparatus according to claim 10, wherein the motor is a wet/dry motor.

14. A power control apparatus for a motor comprising:
a moisture sensor for detecting moisture soaking into a housing including the motor; and
a switching unit which is switched by an output signal of the moisture sensor, and switches on or off an AC power-supply signal applied to a driver circuit capable of providing the motor with a drive power-supply signal,
wherein the switching unit is a relay,
wherein the switching unit includes:
a relay coil for entering a conductive or nonconductive state according to the output signal of the moisture sensor; and
a relay switch for switching on or off the AC power-supply signal applied to the driver circuit according to the conductive or nonconductive state of the relay coil, wherein:
the relay switch is positioned between an AC power source generating the AC power-supply signal and the driver circuit,
the relay coil is connected in series to the moisture sensor, and
the relay coil and the moisture sensor connected in series are connected in parallel to an output terminal of a transformer capable of decreasing the AC power-supply signal.

* * * * *